UNIVERSAL PHOTOLOGIC CIRCUIT HAVING INPUT LUMINESCENT ELEMENTS ARRANGED IN MATRIX RELATION TO OUTPUT PHOTOCONDUCTIVE ELEMENTS WITH SELECTIVE MASK DETERMINING LOGIC FUNCTION PERFORMED
Filed July 21, 1960 6 Sheets-Sheet 1
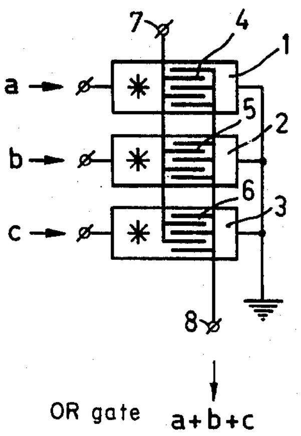
FIG. 3
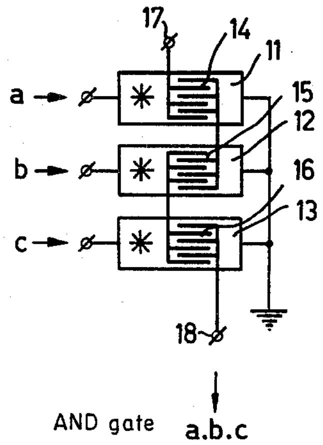
FIG. 4
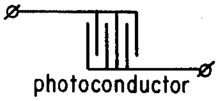
FIG. 2
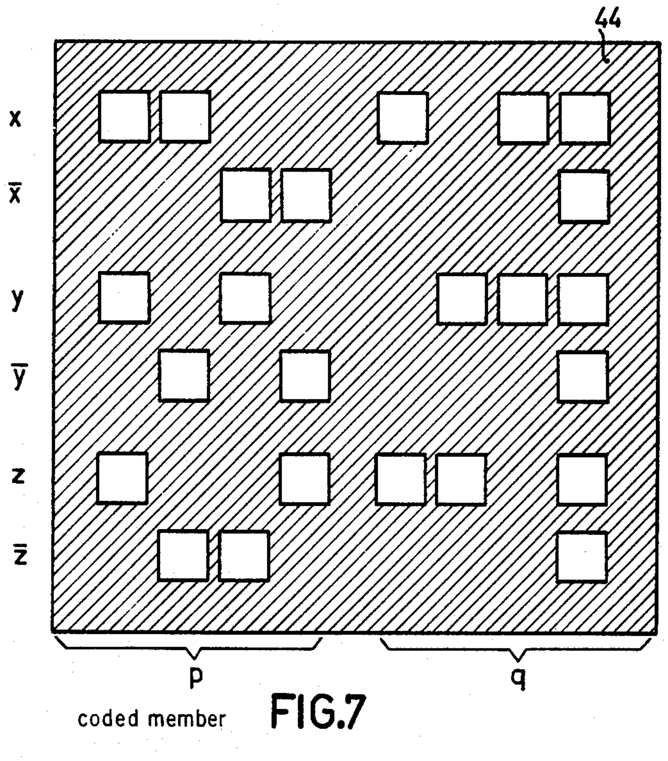
coded member FIG. 7
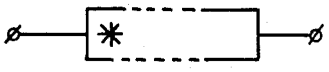
FIG. 1 electroluminescent cell
INVENTOR
ALPHONSUS HEETMAN
BY
Frank R. Jerifari
AGENT UNIVERSAL PHOTOLOGIC CIRCUIT HAVING INPUT LUMINESCENT ELEMENTS ARRANGED IN MATRIX RELATION TO OUTPUT PHOTOCONDUCTIVE ELEMENTS WITH SELECTIVE MASK DETERMINING LOGIC FUNCTION PERFORMED Filed July 21, 1960 6 Sheets-Sheet 2

$S=(x+y+c_i)(x+\bar{y}+\bar{c}_i)(\bar{x}+y+\bar{c}_i)(\bar{x}+\bar{y}+c_i)$ $C_u=(x+c_i)(y+c_i)(x+y)$

INVENTOR
ALPHONSUS HEETMAN

BY
Frank R. Jifani
AGENT

Sept. 7, 1965 A. HEETMAN 3,205,363

UNIVERSAL PHOTOLOGIC CIRCUIT HAVING INPUT LUMINESCENT ELEMENTS ARRANGED IN MATRIX RELATION TO OUTPUT PHOTOCONDUCTIVE ELEMENTS WITH SELECTIVE MASK DETERMINING LOGIC FUNCTION PERFORMED

Filed July 21, 1960 6 Sheets-Sheet 3

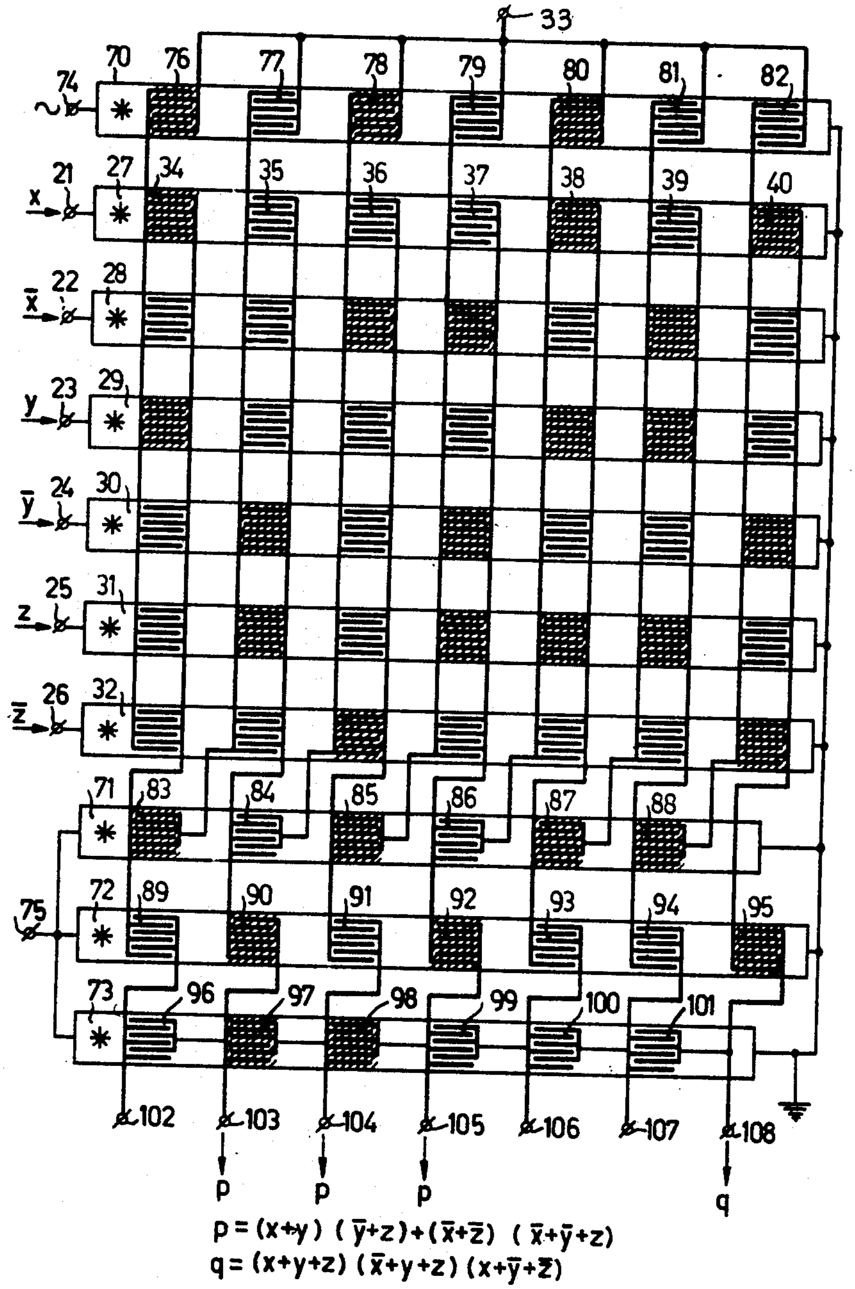

$p=(x+y)\ (\bar{y}+z)+(\bar{x}+\bar{z})\ (\bar{x}+\bar{y}+z)$ $q=(x+y+z)\ (\bar{x}+y+z)\ (x+\bar{y}+\bar{z})$

FIG. 8

INVENTOR
ALPHONSUS HEETMAN

BY
Frank R. Jeifari
AGENT

UNIVERSAL PHOTOLOGIC CIRCUIT HAVING INPUT LUMINESCENT ELEMENTS ARRANGED IN MATRIX RELATION TO OUTPUT PHOTOCONDUCTIVE ELEMENTS WITH SELECTIVE MASK DETERMINING LOGIC FUNCTION PERFORMED

Filed July 21, 1960 6 Sheets-Sheet 4 p=AB+CD
q=EFG r= (A+B) (C+D)
t= E+F+G

INVENTOR
*ALPHONSUS HEETMAN*

BY
Frank R. Jifani
AGENT $r = (x\bar{y}z + xy)(\bar{x}y\bar{z} + \bar{y}z)$ $t = xyz + x\bar{y} + \bar{x}y\bar{z}$ INVENTOR
*ALPHONSUS HEETMAN*
BY
Frank R. Jifan
AGENT Sept. 7, 1965 A. HEETMAN 3,205,363

UNIVERSAL PHOTOLOGIC CIRCUIT HAVING INPUT LUMINESCENT ELEMENTS ARRANGED IN MATRIX RELATION TO OUTPUT PHOTOCONDUCTIVE ELEMENTS WITH SELECTIVE MASK DETERMINING LOGIC FUNCTION PERFORMED

Filed July 21, 1960 6 Sheets-Sheet 6

$S = xyc_i + x\bar{y}\bar{c}_i + \bar{x}y\bar{c}_i + \bar{x}\bar{y}c_i$ $C_u = xc_i + yc_i + xy$

INVENTOR
*ALPHONSUS HEETMAN*

BY
Frank R. Jifari
AGENT

United States Patent Office 3,205,363
Patented Sept. 7, 1965

3,205,363

UNIVERSAL PHOTOLOGIC CIRCUIT HAVING INPUT LUMINESCENT ELEMENTS ARRANGED IN MATRIX RELATION TO OUTPUT PHOTOCONDUCTIVE ELEMENTS WITH SELECTIVE MASK DETERMINING LOGIC FUNCTION PERFORMED

Alphonsus Heetman, Hilversum, Netherlands, assignor to North American Philips Company, Inc., New York, N.Y., a corporation of Delaware Filed July 21, 1960, Ser. No. 44,472
Claims priority, application Netherlands, Aug. 19, 1959, 242,482; Oct. 21, 1959, 244,565
8 Claims. (Cl. 250—208)

The invention relates to a universal logistic circuit arrangement comprising two inputs for each input variable, one of which corresponds to the variable and the other to its negation. The invention has for its object to provide such an embodiment of the arrangement that the logistic processes on the input variable performed by the arrangement can be replaced in a simple manner by another process. The solution provided by the invention has furthermore the advantage that its manufacture involves very low costs. The invention is characterised in that each input is connected to an electrode of an electro-luminescent strip provided on a support and in that the arrangement comprises a second support extending parallel to the former at a short distance therefrom, on which second support groups of photo resistive conductors are provided. The two supports are arranged relatively to each other and the electro-luminescent strips and the photo resistive conductors provided thereon so that each electro-luminescent strip extends just past a photo resistive conductor of each group of photo-contacts and can be optically coupled or decoupled individually with each of these photo resistive conductors by introducing between the two supports a plate which is rendered transparent or not transparent at the place concerned. The arrangement also includes a further group of photo resistive conductors which process further the information furnished by the first-mentioned group of photo resistive conductors while in the groups of photo resistive conductors on the one hand and in the group of additional photo resistive conductors on the other hand a parallel connection (or -function) is performed in one and a series connection (and -function) in the other.

The invention will be described more fully with reference to the drawing.

FIGS. 1 and 2 show the symbols used for an electro-luminescent element and photo resistive conductor.

FIGS. 3, 4 show the arrangements of an OR-gate and an and-gate composed of electro-luminescent elements and photo resistive conductors.

FIGS. 5, 6, 7 show a first embodiment of an arrangement according to the invention.

FIGS. 8, 9 show a second embodiment of an arrangement according to the invention.

Figure 5:
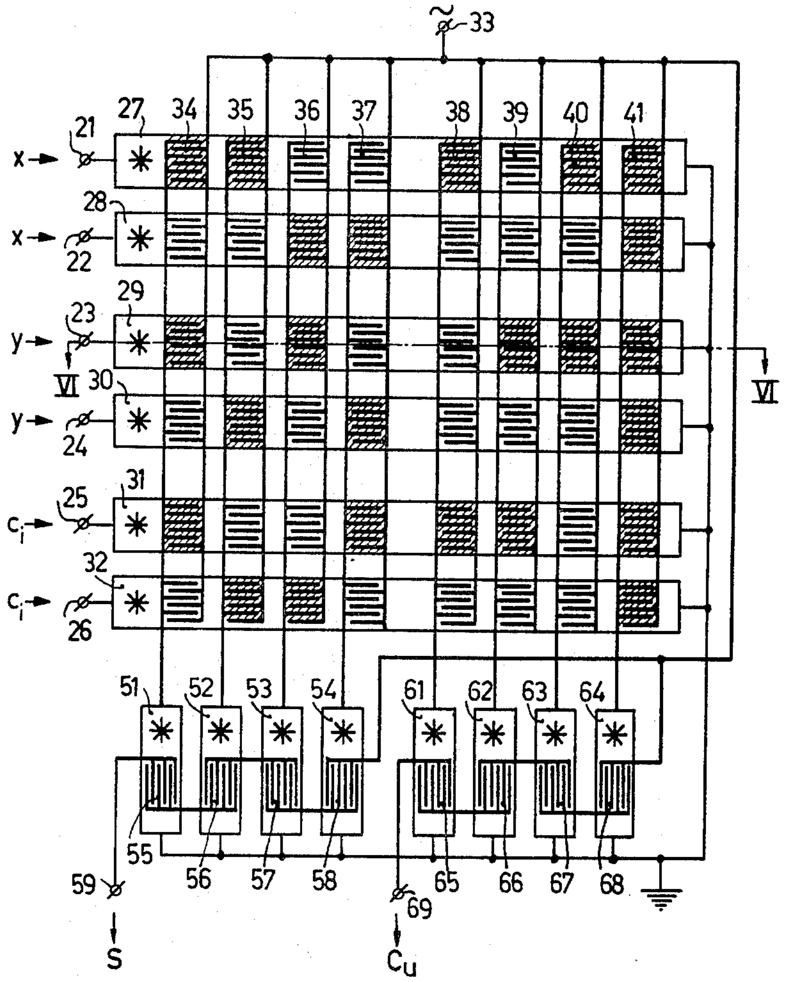

FIG. 1 shows the symbol used herein for an electro-luminescent element and FIG. 2 shows the symbol used for photo resistive conductor. These circuit elements are described extensively in the article of T. B. Tomlinson: "Principles of the Light Amplifier and Allied Devices" (Journ. Brit. I.R.L. vol. 17, 1957, pages 141–154) and in the article of N. A. de Gier, W. van Gool and J. C. van Santen: "Photoweerstanden van geperst en gesinterd Cadmiumsulfide" (Philips Technisch Tijdschrift No. 20, 1958, pages 285–295).

FIGURE 3 shows how a triple OR-gate can be composed from three electro-luminescent elements 1, 2, 3 and three parallel-connected photo resistive conductors 4, 5, 6 optically connected with the former. The three input signals *a, b* and *c* are fed in the form of present or absent alternating voltages each time to one electrode of the electro-luminescent elements 1, 2, and 3, the signal value 1 corresponding to the presence and the signal value 0 corresponding to the absence of an alternating voltage. The terminal 7 is connected to a source, for example, a direct-voltage source. At the terminal 8 occurs the output signal $a+b+c$ (+ signifies or) in the form of a direct voltage or of the absence thereof.

FIG. 4 shows how a triple AND-gate can be composed from three electro-luminescent elements 11, 12, 13 and three series-connected photo resistive conductors 14, 15, 16, optically coupled with the former. The three input signals, *a, b* and *c* are fed again in the form of a present or an absent alternating voltage each time to one electrode of the electro-luminescent elements 11, 12, 13, the signal value 1 corresponding to the presence and the signal value 0 corresponding to the absence of an alternating voltage. The terminal 17 is connected to a source, for example, a direct voltage source. At the terminal 18 occurs the output signal $a.b.c.$ (. signifies and) in the form of a direct voltage or of the absence thereof.

It is known that each Boolean algebraic function can be reduced to a conjunction of disconjunction (conjuntive normal form) and also to a disjunction of conjunctions (disjunctive normal form). See, for example, the article of R. Serrell: "Elements for Boolean Algebra for the Study of Information Handling Systems" (Proceedings of the Institute of Radio Engineers, vol. 41, 1953, pages 1366–1380). By way of example of a binary full adder is considered here. As input information it receives the digits $x$ and $y$ at a given digit place of the two numbers to be added to each other and the carry $c_i$ resulting from the addition at the preceding digit place, from which it forms, as an output information, the sum digit $s$ at the said digit place and the carry $c_u$ to be transferred to the full adder at the next-following digit place. The normal forms of the Boolean algebraic expressions for the variables $s$ and $c_u$ are:

$$s=(x+y+c_i).(x+\bar{y}+\bar{c}_i).(\bar{x}+y+\bar{c}_i).(\bar{x}+\bar{y}+c_i)$$
$$c_u=(x+c_i).(y+c_i).(x+y) \qquad (1)$$
$$s=x.y.c_i+x.\bar{y}.\bar{c}_i+\bar{x}.y.\bar{c}_i+\bar{x}.\bar{y}.c_i$$
$$c_u=x.c_i+y.c_i+xy \qquad (2)$$

wherein (1) designates the conjunctive and (2) the disjunctive normal form of the expressions for the variables $s$ and $c_u$.

Figure 6:
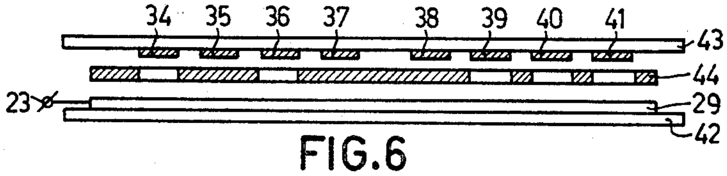

FIGURE 5 shows a first embodiment of a logistic arrangement according to the invention, which is capable of realizing these and numerous other functions. The arrangement comprises six input terminals 21 to 26, to which are fed the signals $x$, $\bar{x}$, $y$, $\bar{y}$, $c_i$, $\bar{c}_i$ in the form of the presence or the absence of an alternating voltage. These input terminals are connected each time to one electrode of six electro-luminescent strips 27 to 32, provided on a support. The other electrodes of these electro-luminescent strips are connected to ground. Reference numeral 33 designates a supply terminal connected to an alternating-voltage source, this terminal being connected to eight groups of parallel-connected photo resistive conductors 34 to 41, provided on a second support. The two supports are positioned relatively to each other and the electro-luminescent elements and photo-resistive conductors are provided thereon so that each electro-luminescent strip extends just past one photo-resistive conductor of each group of parallel-connected photo resistive conductors, with which it can be coupled optically. FIG. 6 shows a cross sectional view thereof. In this figure reference numeral 42 designates the support of the electro-luminescent elements and 43 the support of the photo resistive conductors. The optical coupling and decoupling of the electro-luminescent strips with the photo resistive conductors is obtained by introducing between the two supports an opaque plate 44 (FIG. 6), which can be rendered transparent at given desired places, for example, by perforating the plate at the said places. Consequently, at the perforated places part of an electro-luminescent strip is optically coupled with a photo resistive conductor, whereas at the non-perforated places no optical coupling of part of an electro-luminescent strip with a photo resistive conductor takes place. In FIG. 5 the places where optical coupling is provided are indicated by cross hatching. The manner in which the places of the perforations can be determined will be described more fully hereinafter. FIG. 7 shows the plate 44 with the perforations separately.

The other ends of the first four groups of parallel-connected photo resistive conductors 34, 35, 36, 37 are connected to the inputs of a quadruple AND-gate of the type illustrated in FIG. 4. Reference numerals 51, 52, 53, 54 designate the electro-luminescent elements of this AND-gate, reference numerals 55, 56, 57, 58 designate the series-connected photo resistive conductors and 59 designates the output terminal. The output signal consists in this case of the presence or the absence of an alternating voltage.

In a similar manner the other ends of the second four groups of parallel-connected photo resistive conductors 38, 39, 40, 41 are connected to the inputs of a second quadruple AND-gate. Reference numerals 61, 62, 63, 64 designate the electro-luminescent elements of this gate, reference numerals 65, 66, 67, 68 designate the series-connected photo resistive conductors and 69 designates the output terminal.

The perforations are arranged in the plate so that the output terminal 59 supplies the information $s$ and the output terminal 69 the information $c_u$. In order to determine the locations of the perforations the conjunctive normal forms (1) of these variables are taken as a basis. The perforations are positioned so that the parallel combination of photo resistive conductors 34 to 41 supply in order of succession the information: $x+y+c_i$, $x+\bar{y}+\bar{c}_i$, $\bar{x}+y+\bar{c}_i$, $\bar{x}+\bar{y}+c_i$, $x+c_i$, $y+c_i$, $x+y$ and 1 (see Formulae 1). To this end the plate must be perforated between the electro-luminescent strips 21, 23 and 25 and the parallel combination of the photo resistive conductors 34 (to form the factor $x+y+c_i$), between the electro-luminescent strips 21, 24, 26 and the parallel combination of the photo resistive conductors 35 (to form the factor $x+\bar{y}+\bar{c}_i$) and so on. With respect to the formation of the factor $x+c_i$ it should be noted that $x+c_i$ is equivalent to $x+y+\bar{y}+c_i$. A similar remark applies to the factors $y+c_i$ and $x+y$. The factor 1 is equivalent to $$x+\bar{x}+y+\bar{y}+c_i+\bar{c}_i$$

The quadruple AND-arrangements produce from the information $x+y+c_i$, $x+\bar{y}+\bar{c}_i$, and so on supplied thereto the desired information $s$ and $c_u$. If, for example, $x=1$, $y=0$ and $c_i=1$, the parallel combinations 34, 35, 37, 38, 39, 40 and 41 are conductive, whereas the parallel combination 36 is not conductive. Thus the electro-luminescent elements 51, 52, 54, 61, 62, 63, 64 can luminesce, so that the series combination 55, 56, 57, 58 is not conductive, whereas the series combination 65, 66, 67, 68 is conductive. At the output terminal 59 thus no alternating voltage occurs (signal value 0), but at the output terminal 59 an alternating voltage is produced (signal value 1). This corresponds to the fact that for $x=1$, $y=0$, $c_i=1$, the sum digit $S$ is equal to 0 and the carry $c_u$ is equal to 1.

It is obvious that an arrangement as shown in FIG. 5 is capable of realizing any Boolean algebraic function that can be written as a conjunction of four or fewer disjunctions of three or fewer variables. It will be evident, however, that the principle of the arrangement does not depend upon the number of input variables nor upon the number of factors of the conjunction.

In a practical embodiment of the arrangement the electro-luminescent elements 51 to 54, 61 to 64 can be provided on the support 42, the photo resistive conductors 55 to 58, 65 to 68 on the support 43. In the actual state of this art, it is difficult to provide on the one and the same support both electro-luminescent elements and photo resistive conductors. However, if on the one hand all electro-luminescent strips are provided on one support and on the other all photo resistive conductors on a different support, conductive connections are to be provided extending from one support to the other. FIG. 8 shows an arrangement which does not exhibit this disadvantage and which provides, on the contrary, a few advantages as compared with the embodiments shown in FIGS. 5 and 6. In the said embodiment all electro-luminescent elements are provided in the form of strips on a first support and all photo resistive conductors on a second support extending parallel to the former at a short distance therefrom. The differences from the arrangement shown in FIG. 5 are the following:

(1) Apart from the electro-luminescent strips 27 to 32 the support 42 has four further electro-luminescent strips 70 to 73, which are permanently connected to a supply terminal 74 and 75 respectively, so that they luminesce permanently in the operational state;

(2) Each parallel combination of photo resistive conductors is connected not directly, but via a photo resistive conductor to the supply terminal 33; in FIG. 8 these are the seven photo resistive conductors 76 to 82; each of these photo resistive conductors can be coupled via the plate 44 or not coupled optically wtih the electro-luminescent strip 70;

(3) The output of each parallel combination of photo resistive conductors is connected via a photo resistive conductor to the input of an adjacent parallel combination of photo resistive conductors; in FIG. 8 these are the six photo resistive conductors 83 to 88; each of these photo resistive conductors can be coupled optically or not be coupled optically via the plate 44 with the electro-luminescent strip 71; these conductors fulfill the function of the quadruple AND-gates consisting of the electro-luminescent elements 51 to 54 and 61 to 64 and the photo resistive conductors 55 to 58 and 65 to 68;

(4) The output of each parallel-combination of photo-resistive conductors is connected via a photo resistive conductor to an output terminal; in FIG. 8 these are the seven photo resistive conductors 89 to 95 and the seven output terminals 102 to 108; each of the photo resistive conductors 89 to 95 can be coupled optically or not be coupled optically by the plate 44 with the electro-luminescent strip 72;

(5) Each of the two successive output terminals are connected to each other by a photo resistive conductor; in FIG. 8 these are the six photo resistive conductors 96 to 101; each of these six photo resistive conductors can be coupled optically or not be coupled optically by the plate 44 with the electro-luminescent strip 73.

Figure 9:
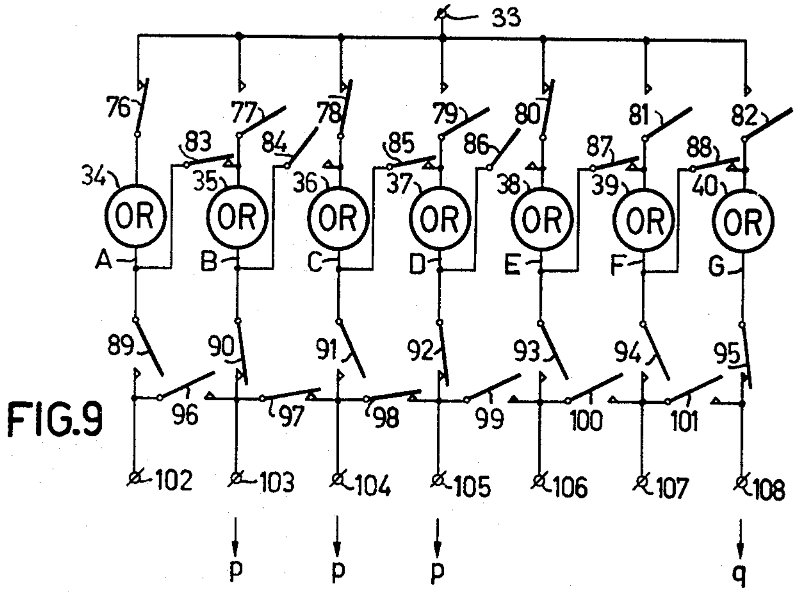

FIG 9 shows a better survey of the arrangement diagram. The parallel combinations 34 to 40 are indicated in this figure by circles designated by the character V (latin "vel"=or), the further photo resistive conductors are indicated by the symbol of a switch.

The arrangement shown in FIG. 8 offers a possibility not presented in the arrangement of FIG. 5, i.e. the formation of a function as for example:

$$p=(x+y).(\bar{y}+z).(\bar{x}+\bar{z}).(\bar{x}+\bar{y}+z) \quad (3)$$

The plate 44 is perforated to this end so that the parallel combinations 34, 35, 36 and 37 form the functions: $x+y$, $\bar{y}+z$, $\bar{x}+\bar{z}$ and $\bar{x}+\bar{y}+z$ respectively. It has been stated above how the places are found where a hole is to be provided. Then further holes are punched at the places where the photo resistive conductors 76, 83, 90, 78, 85, 92, 98, 97 (see FIGS. 8 and 9) are provided. At each of the output terminals 103, 104, and 105 then occurs the signal $p$.

If, in addition, the signal:

$$q=(x+y+z).(\bar{x}+y+z).(x+\bar{y}+\bar{z}) \quad (4)$$

is to be formed, the plate 44 is punched furthermore so that the parallel combinations 38, 39 and 40 form the functions $x+y+z$, $\bar{x}+y+z$ and $x+\bar{y}+\bar{z}$ and that the photo resistive conductors 80, 87, 88 and 95 are exposed. The signal $q$ then occurs at the output terminal 108.

It should be noted here that the advantage of the additional possibilities offered by the arrangement shown in FIG. 8 is hardly obtained for three input variables, since, for example, the expression for $p$ can be simplified into the much simpler expression:

$$p=\bar{x}+\bar{y}+z \quad (5)$$

which, however, is not always possible for four or more input variables and takes sometimes comparatively much time. In these cases the arrangement of FIG. 8 is absolutely of greater and more versatile use than the arrangement of FIG. 5.

Figure 10:
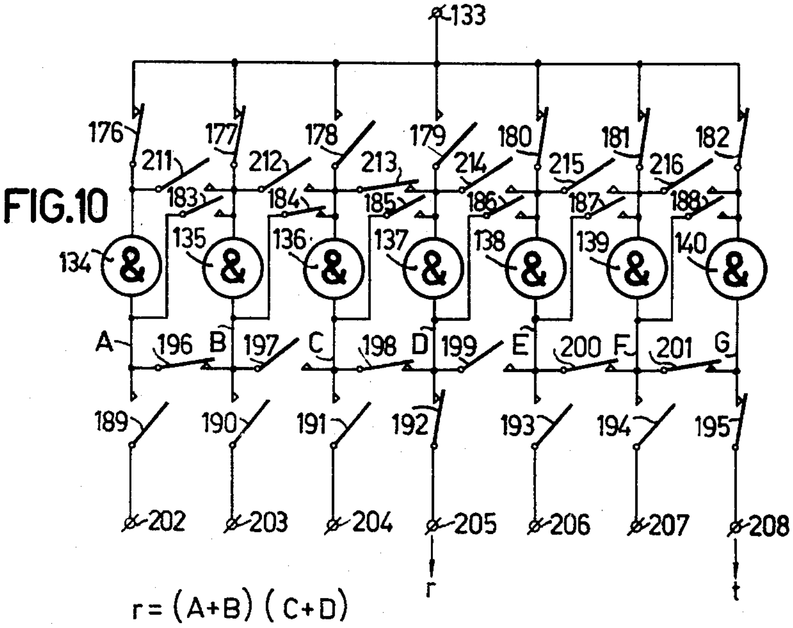
FIGS. 10 and 11 show a third embodiment of an arrangement according to the invention.
Figure 11:
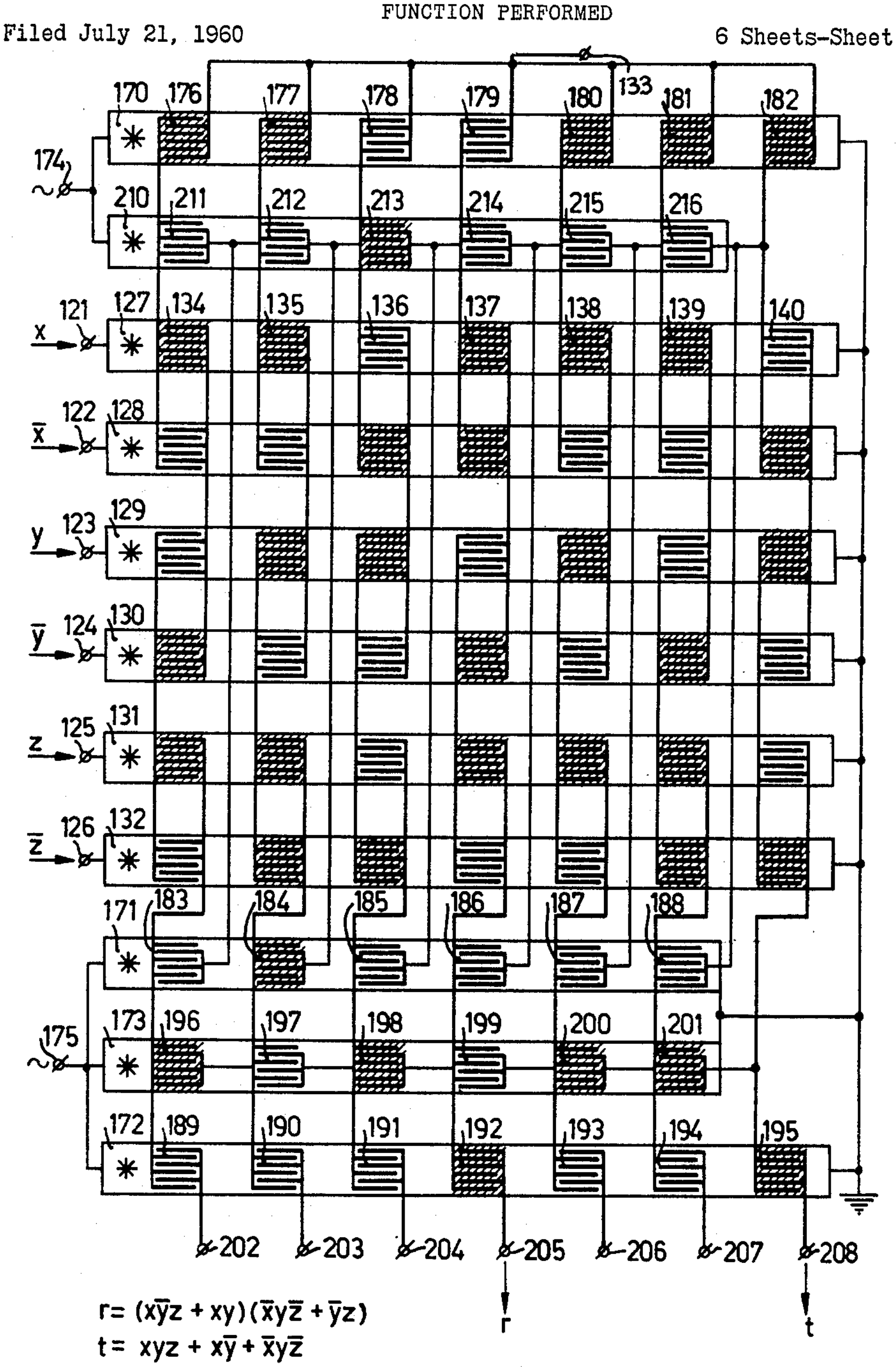

It is obvious that also on the basis of the disjunctive normal form logistic arrangements according to the invention can be built up. In this case the principal diagram of FIG. 9 is to be replaced by that shown in FIG. 10, which differs from that shown in FIG. 9 only in that the parallel combinations of photo resistive conductors are replaced by series combinations (indicated in FIG. 10 by a circle with the reference &) and that the inputs of these series combinations are pairwise connected to each other by a photo resistive conductor. In FIG. 10 the photo resistive conductors between the output terminals are, moreover, displaced towards the output terminals of the series combinations, but this displacement is not essential. It is obvious that a term such as: $x\bar{y}z$ is obtained by punching holes at the places between the electro-luminescent elements 127, 130 and 131 of one of the series combinations 134 to 140. In order to obtain a term such as, for example $xy$, holes are to be punched at the places between the electro-luminescent elements 127, 129, 131 and 132 and one of the series combinations 134 to 140. FIG. 11 shows a practical embodiment of the arrangement of FIG. 10 with photo resistive conductors provided on a support. Cross hatching indicates how the signal:

$$r=(x\bar{y}z+xy).(\bar{x}y\bar{z}+\bar{y}z) \quad (6)$$

can be formed. This signal can be formed again in a much simpler manner by starting from the simpler expression:

$$r=x\bar{y}z$$

for a variable $r$. However, thereto applies a similar remark as made with reference to the embodiment shown in FIG. 8.

Figure 12:
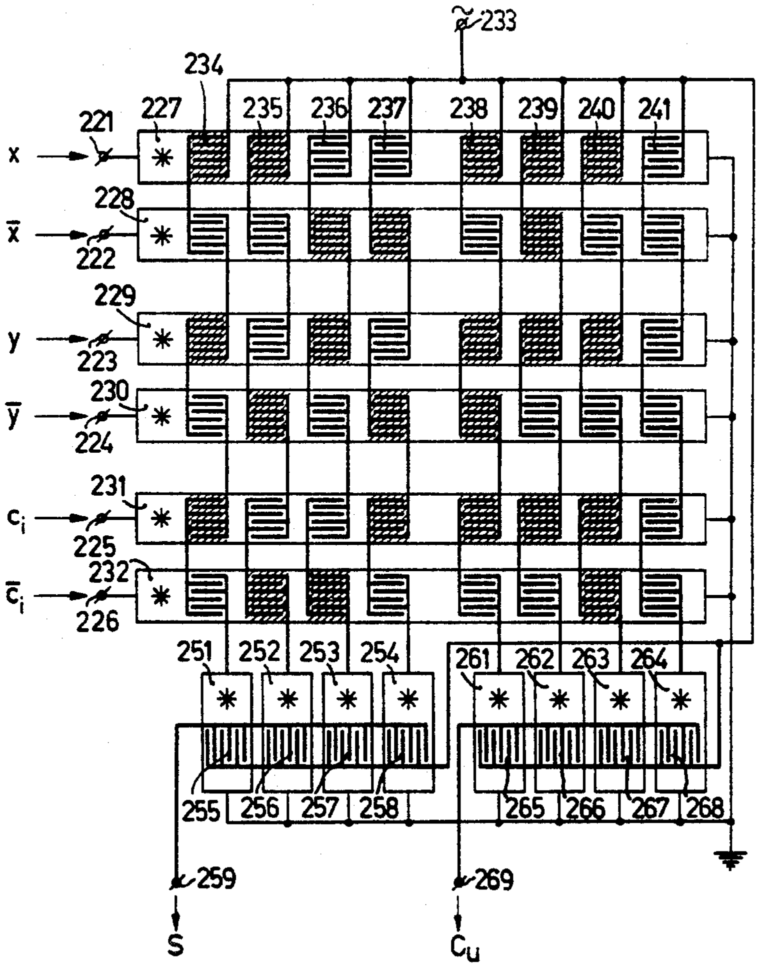
FIG. 12 shows a fourth embodiment of an arrangement according to the invention.

It will be evident that the arrangement of FIG. 5 may also be adapted to the disjunctive normal form. When the arrangement shown in FIG. 12 is obtained, the major differences with respect to FIG. 5 being that the interconnections between the groups of photocells 234–241 in FIG. 12 are series and the interconectionns between photocells 251–254 and 261–264 are parallel. This structure is evident from an examination of Equations 2 above.

While the invention has been described with respect to various embodiments, many modifications thereof will be apparent to those skilled in the art without departing from the inventive concept, the scope of which is set forth in the appended claims.

What is claimed is:

1. A universal photo logic matrix for processing binary coded input information each bit of which is in the form of a voltage appearing at the first of a pair of input terminals if the bit is a "one" and at the second input terminal of the pair if the bit is a "zero," a first support, a plurality of electroluminescent strips each connected to a different input terminal of the binary coded information and mounted on the first support, a second support spaced from and parallel to the electroluminescent strips, a plurality of sets of photo resistive conductors mounted on said second support so as to provide a clearance between the electroluminescent elements and the sets of photo resistive conductors, each said set having a single different photo resistive conductor opposite each electroluminescent strip, means connecting all the photo resistive conductors in each set in parallel, and means providing selectively translucent and opaque areas inserted between the electroluminescent strips and the photo resistive conductors for selectively enabling those photo resistive conductors in registration with the translucent areas and disabling those photo resistive conductors in registration with the opaque areas.

2. A universal photo logic matrix for processing binary coded input information each bit of which is in the form of a voltage appearing at the first of a pair of input terminals if the bit is a "one" and at the second input terminal of the pair if the bit is a "zero," a first support, a plurality of electroluminescent strips each connected to a different input terminal of the binary coded information and mounted on the first support, a second support spaced from and parallel to the electroluminescent strips, a plurality of sets of photo resistive conductors mounted on said second support so as to provide a clearance between the electroluminescent elements and the sets of photo resistive conductors, each said set having a single different photo resistive conductor opposite each electroluminescent strip, means connecting pairs of photo resistive conductors in each set opposite strips corresponding to the same binary bit in parallel, means connecting the parallel pairs in each set in series, and means providing selectively translucent and opaque areas inserted between the electroluminescent strips and the photo resistive conductors for selectively enabling those photo resistive conductors in registration with the translucent areas and disabling those photo resistive conductors in registration with the opaque areas.

3. A universal photo logic circuit for processing binary coded input information each bit of which is in the form of a voltage appearing at the first of a pair of input terminals if the bit is a "one" and at the second input terminal of the pair if the bit is a "zero," a first support, a plurality of electroluminescent strips each connected to different input terminals of the binary coded information and mounted on the first support, a second support spaced from and parallel to the electroluminescent strips, a plurality of sets of photo resistive conductors mounted on said second support so as to provide a clearance between the electroluminescent elements and the sets of photo resistive conductors, each said set having a single different photo resistive conductor opposite each electroluminescent strip, means connecting all the photo resistive conductors in each set in parallel, means providing selectively translucent and opaque areas inserted between the electroluminescent strips and the photo resistive conductors in registration with the translucent areas and disabling those in registration with the opaque areas, and input and output logic means for selectively connecting the sets of photo resistive conductors to indicate the condition of the input terminals.

4. A universal photo logic circuit for processing binary coded input information each bit of which is in the form of a voltage appearing at the first of a pair of input terminals if the bit is a "one" and at the second input terminal of the pair if the bit is a "zero," a first support, a plurality of electroluminescent strips each connected to different input terminals of the binary coded information and mounted on the first support, a second support spaced from and parallel to the electroluminescent strips, a plurality of sets of photo resistive conductors mounted on said second support so as to provide a clearance between the electroluminescent elements and the sets of photo resistive conductors, each said set having a single different photo resistive conductor opposite each electroluminescent strips, means connecting pairs of photo resistive conductors in each set opposite strips corresponding to the same binary bit in parallel, means connecting the parallel pairs in each set in series, means providing selectively translucent and opaque areas inserted between the electroluminescent strips and the photo resistive conductors for selectively enabling those photo resistive conductors in registration with the translucent areas and disabling those in registration with the opaque areas, and input and output logic means for selectively connecting the sets of photo resistive conductors to indicate the condition of the input terminals.

5. A universal photo logic circuit block for processing binary coded input information each bit of which is in the form of an alternating voltage appearing at the first of a pair of terminals if the bit is "one" and at the second if the bit is "zero," a first support, a first plurality of electroluminescent strips mounted on said first support and each connected to a different terminal of the binary coded information, a second support spaced from and parallel to the electroluminescent strips, a first plurality of sets of photo resistive conductors mounted on said second support so as to provide a clearance between the electroluminescent elements and the sets of photo resistive conductors, each said set having a single different photo resistive conductor opposite each electroluminescent strip, means connecting all the photo resistive conductors in each set in parallel, a second plurality of electroluminescent strips mounted on said first support, means for energizing said second plurality of strips, a second plurality of sets of photo resistive conductors mounted on said second support each of said second set having a single different photo resistive conductor opposite each electroluminescent strip of said second plurality of strips, means connecting one photo resistive conductor of said second plurality of sets to a voltage source and each said one photo resistive conductor in series with a different set of said first plurality of parallel connected photo resistive conductors, means serially connecting adjacent parallel connected sets of said first plurality of photo resistive conductors each through a different single photo resistive conductor of said second plurality of conductors, means including at least one photo resistive conductor of said second plurality of conductors for connecting each parallel connected set of said first plurality of photo resistive conductors to an output terminal and means providing selectively translucent and opaque areas inserted between the electroluminescent strips and the first and second plurality of photo resistive conductors for enabling selected photo resistive conductors in each set whereby the voltage appearing at the said output terminals is indicative of the condition of the binary code applied to the input terminals.

6. A universal photo logic circuit block for processing binary coded input information each bit of which is in the form of an alternating voltage appearing at the first of a pair of terminals if the bit is "one" and at the second if the bit is "zero," a first support, a first plurality of electroluminescent strips mounted on said first support and each connected to a different terminal of the binary coded information, a second support spaced from and parallel to the electroluminescent strips, a first plurality of sets of photo resistive conductors mounted on said second support so as to provide a clearance between the electroluminescent elements and the sets of photo resistive conductors, each said set having a single different photo resistive conductor opposite each electroluminescent strip, means parallel connecting pairs of photo resistive elements in each set opposite strips corresponding to the same binary bit, means serially connecting the parallel connected pairs in each set, a second plurality of electroluminescent strips mounted on said first support, means for energizing said second plurality of strips, a second plurality of sets of photo resistive conductors mounted on said second support each said second set having a single different photo resistive conductor opposite each electroluminescent strip of said second plurality of strips, means connecting one photo resistive conductor of said second plurality of sets to a voltage source and each said one conductor in series with a different set of said first plurality of photo resistive conductors, means serially connecting adjacent sets of said first plurality of photo resistive conductors each through a different single photo resistive conductor of said second plurality of conductors, means parallel connecting adjacent sets of said first plurality of photo resistive conductor each through a different pair of photo resistive conductors of said second plurality of conductors, means including a different single photo resistive conductor of said second plurality of photo resistive conductors for connecting each set of said first plurality of photo resistive conductors to an output terminal, and means providing selectively translucent and opaque areas inserted between the electroluminescent strips and the first and second plurality of photo resistive conductors for enabling selected photo resistive conductors in each set whereby the voltage appearing at the said output terminals is indicative of the condition of the binary code applied to the input terminals.

7. A universal photo logic circuit for processing binary coded input information each bit of which is in the form of a voltage appearing at the first of a pair of input terminals of the bit is a "one" and at the second input terminal of the pair if the bit is a "zero," a first support, a plurality of electroluminescent strips each connected to a different input terminal of the binary coded information and mounted on the first support, a second support spaced from and parallel to the electroluminescent strips, a plurality of sets of photo resistive conductors mounted on said second support so as to provide a clearance between the electroluminescent elements and the sets of photo resistive conductors, each said set having a single different photo resistive conductor opposite each electroluminescent strip, means connecting all the photo resistive conductors in each set in parallel, means providing selectively translucent and opaque areas inserted between the electroluminescent strips and the photo resistive conductors for selectively enabling those photo resistive conductors in registration with the translucent areas and disabling those in registration with the opaque areas, first selectively operable means individually connecting each parallel connected set of photo resistive conductors to a voltage source, second selectively operable means connecting adjacent parallel connected sets of photo resistive conductors in series, and third selectively operable means connecting each parallel connected set of photo resistive conductors to an output terminal the voltages of which indicate the condition of the input terminals.

8. A universal photo logic circuit for processing binary coded input information each bit of which is in the form of a voltage appearing at the first of a pair of input terminals if the bit is a "one" and at the second input terminal of the pair if the bit is a "zero," a first support, a plurality of electroluminescent strips each connected to different input terminals of the binary coded information and mounted on the first support, a second support spaced from and parallel to the electroluminescent strips, a plurality of sets of photo resistive conductors mounted on said second support so as to provide a clearance between the electroluminescent elements and the sets of photo resistive conductors, each said set having a single different photo resistive conductor opposite each electroluminescent strip, means connecting pairs of photo resistive conductors in each set opposite strips corresponding to the same binary bit in parallel, means connecting the parallel pairs in each set in series, means providing selectively translucent and opaque areas inserted between the electroluminescent strips and the photo resistive conductors for selectively enabling those photo resistive conductors in registration with the translucent areas and disabling those in registration with the opaque areas, first selectively operable means for individually connecting each set of photo resistive conductors to a voltage source, second selectively operable means connecting adjacent sets of photo resistive conductors in series, third selectively operable means parallel connecting adjacent sets of photo resistive conductors and fourth selectively operable means for connecting each set of said photo resistive conductors to an output terminal the voltages of which indictae the condition of the input terminals.

References Cited by the Examiner

UNITED STATES PATENTS

| | | | |
|---|---|---|---|
| 2,885,564 | 5/59 | Marshall | 307—88.5 |
| 2,916,624 | 12/59 | Angel et al. | 250—208 X |
| 2,921,204 | 1/60 | Hastings et al. | 250—208 X |
| 2,936,380 | 5/60 | Anderson | 235—176 |
| 2,940,669 | 6/60 | Hobbs | 235—175 |
| 2,952,792 | 9/60 | Yhap | 307—885 |
| 2,953,689 | 9/60 | Becker | 250—209 |
| 2,954,476 | 9/60 | Ghandhi | 250—213 |
| 2,967,276 | 1/61 | Colton | 328—92 |
| 3,020,534 | 2/62 | Jones | 250—208 X |
| 3,029,345 | 4/62 | Douglas | 250—208 |
| 3,037,077 | 5/62 | Williams et al. | 250—209 X |
| 3,046,540 | 7/62 | Litz et al. | 250—213 |
| 3,050,633 | 8/62 | Loebner | 250—209 |

RALPH G. NILSON, *Primary Examiner.*

HERMAN K. SAALBACH, *Examiner.*